Figure 1:
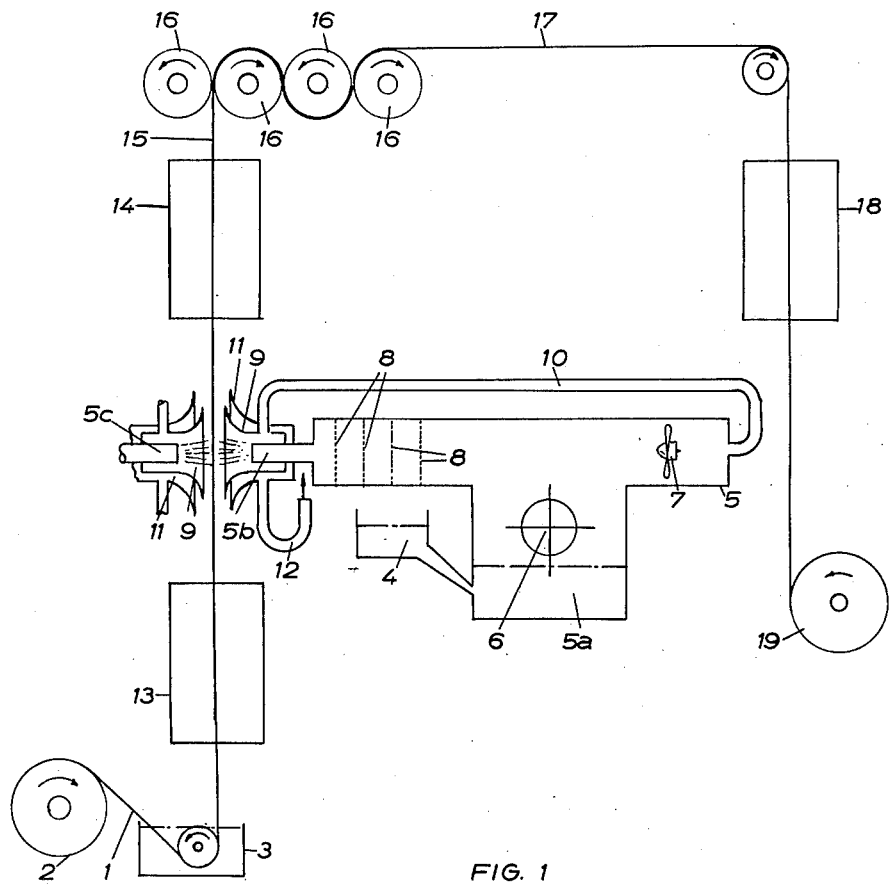

April 10, 1962   S. B. HAINSWORTH ETAL   3,029,166
POWER TRANSMISSION AND CONVEYOR BELTING
Filed Nov. 23, 1959   2 Sheets-Sheet 1

Sydney Beetham Hainsworth
Gilbert Ernest Watts
INVENTORS

BY
Mead, Browne, Schuyler & Beveridge
ATTORNEYS

April 10, 1962   S. B. HAINSWORTH ETAL   3,029,166
POWER TRANSMISSION AND CONVEYOR BELTING
Filed Nov. 23, 1959   2 Sheets-Sheet 2

Sydney Beetham Hainsworth
Gilbert Ernest Watts
INVENTORS

BY

Mead, Browne, Schuyler & Beveridge
ATTORNEYS

3,029,166
POWER TRANSMISSION AND CONVEYOR BELTING
Sidney Beetham Hainsworth, Elloughton, near Brough, and Gilbert Ernest Watts, Garden Village, Hull, England, assignors to J. H. Fenner & Co. Limited, Marfleet, Hull, England
Filed Nov. 23, 1959, Ser. No. 854,658
Claims priority, application Great Britain Nov. 27, 1958
11 Claims. (Cl. 117—216)

This invention relates to the production of power transmission and conveyor belting of the type in which a multiple ply textile fabric is impregnated and/or coated, for example, with natural or synthetic rubber or with a composition containing a compound of the class known as "plastics," such as a polyvinyl compound, and particularly polyvinyl chloride. The invention is particularly concerned with belting of the type described in British patent specification No. 770,524.

British patent application 821,059 describes the application of a coating of electrically conductive carbon to an outer surface or surfaces of belting of the aforementioned type, after impregnation and/or coating of the multiple ply textile fabric, in order to reduce the surface resistivity of the belting without causing substantial deterioration of the physical properties of the belting. Preferably the application of the carbon takes place after the impregnation and/or coating of the fabric and before heat treatment of the impregnated and/or coated fabric in order to gel the impregnating and/or coating material.

According to the present invention, the impregnating and/or coating material, e.g. polyvinyl chloride, is at least partially gelled before the carbon is applied to the belting surface or surfaces.

Thus, the impregnating material may be substantially fully gelled by heating, e.g. by passing the belting through a heated tunnel as described in our British patent specification No. 770,524, and the carbon applied immediately after the heating step while the surface of the belting is still in a hot, semi-mobile or soft condition. Where the impregnating and/or coating material comprises polyvinyl chloride, the heating step is carried out at 170° to 180° C., the carbon being applied before the impregnating and/or coating material has cooled below 70° C.

Alternatively, the impregnating material may be only partially gelled before the carbon is applied, and gelation is completed, after the application of the carbon, by raising the temperature of the belting. Where the impregnating and/or coating material comprises polyvinyl chloride, the partial gelation is carried out at a temperature of 100° C. or more, the gelation is completed after the carbon has been applied by raising the temperature to 170° to 180° C.

In either case, after gelation is completed, the belting is preferably pressed between rollers to consolidate the carbon in the belting surface before the belting is cooled.

The carbon may be applied as a powder by blowing it on to the belting surface or by spreading it on lightly with a cloth or brush. Only a light application of carbon dust is necessary; sufficient to give a uniform grey or black colouration to the surface but not to show any loose powder after consolidation between the pressure rollers.

Although partially or fully gelled impregnating material is less fluid than in its ungelled condition, the take-up of carbon on the surface of such partially or fully gelled material is sufficient to reduce the surface resistivity, as measured in accordance with the Isleworth test for resistivity, from about $10^{10}$ ohms for an untreated surface to about $10^5$ ohms for a treated surface. This latter figure is well below the maximum limit of $3 \times 10^8$ ohms set by the National Coal Board for belting in mines, and this belting produced according to the invention meets the anti-static requirements of the National Coal Board.

Partial or full gelation of polyvinyl chloride causes it to pass to a solid phase. The change of phase, i.e. semi-gelation, occurs at about 90° to 110° C., depending upon the composition of the impregnating material, and from these temperatures up to the full gelation temperature of 170° to 180° C., the belting remains tacky and will accept carbon dust. Above 180° C., there is a tendency for decomposition of the polyvinyl chloride to occur. If the belting is allowed to cool substantially below the semi-gelation temperature, or the surface is modified as in passing through a cooling water bath, or chilled cooling rollers, then the affinity for carbon dust is reduced. Provided that the surface is not soiled by acceptance of a film of dirt or grease, the effect seems to be purely one of temperature and surface finish. There is less affinity for carbon dust if the surface is rolled or pressed smooth prior to treatment and it is preferable to perform the carbon application prior to any such rolling. The rolling, when subsequently applied, consolidates the treated surface.

Figure 2:
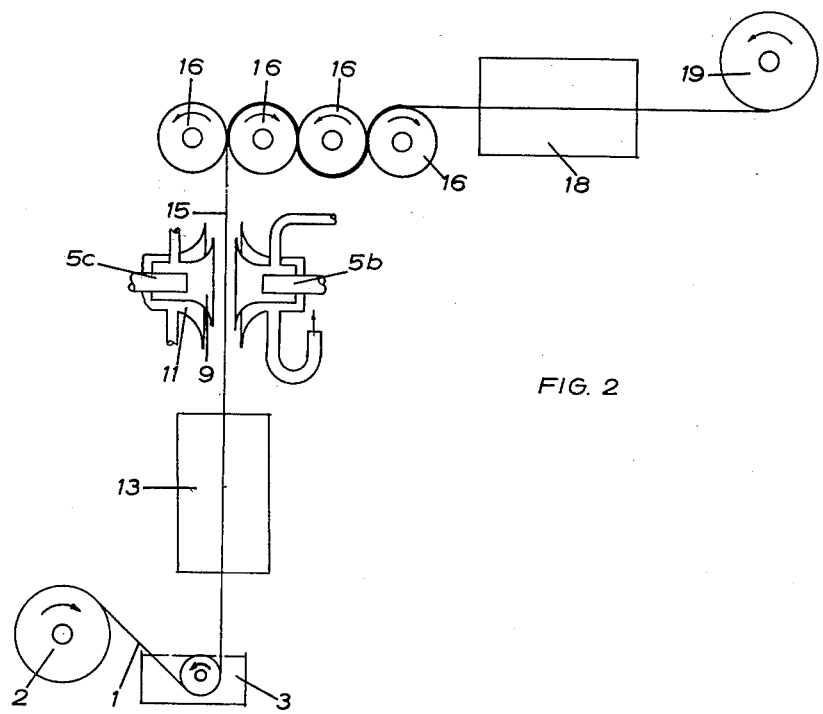

The invention will now be further described with reference to the accompanying drawings in which FIG. 1 illustrates diagrammatically a method of providing a consolidated coating of an electrically conductive carbon on the outer surfaces of power transmission or conveyor belting, and FIG. 2 illustrates a modification of the method illustrated in FIG. 1.

In the drawings, like numbers refer to like parts.

Referring to FIG. 1, solid woven multiple ply textile fabric 1 is drawn from a roll 2 and passes through an impregnating bath 3 containing a dispersion consisting of approximately 45% by weight of polyvinyl chloride powder intimately ground with 55% by weight of tricresyl phosphate together with small amounts of a stabilizer and colouring matter. It is advisable that the fabric is in a cool condition when it enters the impregnating bath since otherwise the heat in the fabric may warm the dispersion sufficiently to destabilize it. Passage of the fabric through the air before it enters the impregnating bath can reduce the fabric temperature considerably. The impregnating bath operates at any convenient temperature between 15° C. and 35° C. It is advantageous to operate at the higher end of this range to increase the mobility of the dispersion and ensure uniform impregnation and coating of the fabric.

Carbon black is supplied from a hopper 4 to the well 5a of a chamber 5. A beater 6 raises a cloud of carbon powder within the chamber 5 and a fan 7 blows the carbon powder to the spraying nozzle 5b of the chamber 5 via wire gauze screens 8 which serve to produce a uniform distribution of the carbon powder.

From the impregnating bath 3, the impregnated fabric passes through a gelling chamber 13 maintained at a temperature such that the temperature of the impregnated fabric is raised to a temperature of about 100° C. or more at which semi-gelation of the dispersion occurs. After leaving the gelling chamber 13 the impregnated fabric passes between the spraying nozzle 5b and a similar spraying nozzle 5c, which may be supplied with carbon powder either from chamber 5 or from a separate chamber (not shown) similar to chamber 5. Carbon powder from spraying nozzles 5b and 5c is sprayed on to opposite sides of the impregnated fabric and adheres to the surface of the partly gelled dispersion impregnating the fabric. Surplus powder is substantially confined within a shield 9 surrounding nozzle 5b and is returned to chamber 5 via a tube 10 connecting the interior of the shield to the suction side of fan 7. Shield 9 is surrounded by a second shield 11 and any powder escaping from the confines of shield 9 is drawn within shield 11 and removed by suction through a tube 12 communicating with the interior of shield 11. Spraying nozzle 5c is similarly associated with shields 9 and 11.

After receiving a surface coating of carbon powder, the impregnated and coated fabric passes through a gelling chamber 14 maintained at a temperature such that the temperature of the impregnated fabric is raised to the full gelation temperature of 170° to 180° C. to complete gelation of the polyvinyl chloride dispersion and consolidate the carbon coating upon the surface of the impregnated fabric. Thus the gelling chamber 14 may be maintained at 250° to 280° C. From the chamber 14 the resultant belting 15 passes between the rollers 16 which exert pressure upon the belting surface to produce further consolidation of the carbon coating upon the belting surface. The resultant belting 17 passes through a cooling chamber 18 to a take up roll 19.

Referring to FIG. 2, the method illustrated in FIG. 1 is modified in that the gelling chamber 14 is omitted and the temperature in the gelling chamber 13 is such that the temperature of the impregnated fabric is raised to the full gelation temperature of 170° to 180° C. to cause substantially full gelation of the dispersion. Thus the gelling chamber 13 may be maintained at 250° to 280° C. Immediately after leaving the gelling chamber, the impregnated fabric passes between the spraying nozzles 5b and 5c from which carbon powder is sprayed on to opposite sides of the impregnated fabric and adheres to the surface of the gelled dispersion impregnating the fabric. The reason that the carbon adheres is that the surface is still in a tacky condition since the impregnated fabric has not had time to cool below about 70° C. The subsequent pressing between rollers 16 and cooling in the chamber 18 complete the consolidation of the carbon coating and hardening of the gelled dispersion.

We claim:

1. In the manufacture of power transmission and conveyor belting by impregnating a multiple ply textile fabric with an impregnating material selected from the group consisting of natural rubber, synthetic rubber and polyvinyl compounds, and thereafter heating the impregnated fabric to gell the impregnating material, the steps of at least partially gelling the impregnated material and thereafter applying a coating of electrically conductive carbon to the surface of the impregnating material while the surface is still in an adhesive condition, thereby reducing the surface resistivity of the belting.

2. In the manufacture of power transmission and conveyor belting by impregnating a multiple ply textile fabric with an ungelled polyvinyl compound capable of passing to solid phase without shrinkage when gelled by heat treatment, and thereafter heating the impregnated fabric to gel the polyvinyl compound, the steps of partially gellng the polyvinyl compound, and thereafter applying a coating of electrically conductive carbon directly in powder form to the surface of the polyvinyl compound while the surface is still in an adhesive condition, thereby reducing the surface resistivity of the belting.

3. In the manufacture of power transmission and conveyor belting by impregnating a multiple ply textile fabric with an ungelled polyvinyl chloride capable of passing to solid phase without shrinkage when gelled by heat treatment, and thereafter heating the impregnated fabric to gel the polyvinyl chloride, the steps of partially gelling the polyvinyl chloride, and thereafter applying a coating of electrically conductive carbon directly in powder form to the surface of the polyvinyl chloride while the surface is still in an adhesive condition, thereby reducing the surface resistivity of the belting.

4. In the manufacture of power transmission and conveyor belting by impregnating a multiple ply textile fabric with an ungelled polyvinyl compound capable of passing to solid phase without shrinkage when gelled by heat treatment, and thereafter heating the impregnated fabric to gel the polyvinyl compound, the steps of substantially fully gelling the polyvinyl compound by heating, applying a coating of electrically conductive carbon to the surface of the polyvinyl compound while said surface is still in a hot soft condition, thereby reducing the surface resistivity of the belting, and thereafter cooling the belting to harden the surface and consolidate the carbon coating.

5. In the manufacture of power transmission and conveyor belting by impregnating a multiple ply textile fabric with an ungelled polyvinyl chloride capable of passing to solid phase without shrinkage when gelled by heat treatment, and thereafter heating the impregnated fabric to gel the polyvinyl chloride, the steps of substantially fully gelling the polyvinyl chloride by heating at a temperature of 170° to 180° C., applying a coating of electrically conductive carbon to the surface of the polyvinyl chloride before the surface has cooled below 70° C., thereby reducing the surface resistivity of the belting, and thereafter cooling the belting to consolidate the polyvinyl chloride surface and the carbon coating thereon.

6. In the manufacture of power transmission and conveyor belting by impregnating a multiple ply textile fabric with an ungelled polyvinyl compound capable of passing to solid phase without shrinkage when gelled by heat treatment, and thereafter heating the impregnated fabric to gel the polyvinyl compound, the steps of partially gelling the polyvinyl compound, applying a coating of electrically conductive carbon to the surface of the polyvinyl compound, thereby reducing the surface resistivity of the belting and thereafter completing gelation of the polyvinyl compound by raising the temperature of the belting.

7. In the manufacture of power transmission and conveyor belting by impregnating a multiple ply textile fabric with an ungelled polyvinyl chloride capable of passing to solid phase without shrinkage when gelled by heat treatment, and thereafter heating the impregnated fabric to gel the polyvinyl chloride, the steps of partially gelling the polyvinyl chloride by heating at a temperature of at least 100° C., applying a coating of electrically conductive carbon to the surface of the polyvinyl chloride, thereby reducing the surface resistivity of the belting, and thereafter raising the temperature of the surface to 170° to 180° C. to complete the gelation of the polyvinyl chloride.

8. In the manufacture of power transmission and conveyor belting by impregnating a multiple ply textile fabric with an ungelled polyvinyl compound capable of passing to solid phase without shrinkage when gelled by heat treatment, and thereafter heating the impregnated fabric to gel the polyvinyl compound, the steps of substantially fully gelling the polyvinyl compound by heating, applying a coating of electrically conductive carbon directly in powder form to the surface of the polyvinyl compound while said surface is still in a hot soft condition, thereby reducing the surface resistivity of the belting, applying pressure to said surface and thereafter cooling the belting to harden the surface and consolidate the carbon coating.

9. In the manufacture of power transmission and conveyor belting by impregnating a multiple ply textile fabric with an ungelled polyvinyl chloride capable of passing to solid phase without shrinkage when gelled by heat treatment, and thereafter heating the impregnated fabric to gel the polyvinyl chloride, the steps of substantially fully gelling the polyvinyl chloride by heating at a temperature of 170° to 180° C., blowing electrically conductive carbon in powder form onto the surface of the polyvinyl chloride before the surface has cooled below 70° C., thereby reducing the surface resistivity of the belting, applying pressure to said surface by pressing the belting between rollers and thereafter cooling the belting to consolidate the polyvinyl chloride surface and the carbon coating thereon.

10. In the manufacture of power transmission and conveyor belting by impregnating a multiple ply textile fabric with an ungelled polyvinyl compound capable of passing to solid phase without shrinkage when gelled by heat treatment, and thereafter heating the impregnated fabric to gel the polyvinyl compound, the steps of partially gelling the polyvinyl compound, applying a coating of electrically conductive carbon directly in powder form to the surface of the polyvinyl compound, thereby reducing the surface resistivity of the belting, completing gelation of the polyvinyl compound by raising the temperature of the belting, applying pressure to said surface and thereafter cooling the belting to harden the surface and consolidate the carbon coating.

11. In the manufacture of power transmission and conveyor belting by impregnating a multiple ply textile fabric with an ungelled polyvinyl chloride capable of passing to solid phase without shrinkage when gelled by heat treatment, and thereafter heating the impregnated fabric to gel the polyvinyl chloride, the steps of partially gelling the polyvinyl chloride by heating at a temperature of at least 100° C., blowing electrically conductive carbon in powder form onto the surface of the polyvinyl chloride, thereby reducing the surface resistivity of the belting, raising the temperature of the surface to 170° to 180° C. to complete the gelation of the polyvinyl chloride, applying pressure to said surface by pressing the belting between rollers and thereafter cooling the belting to harden the surface and consolidate the carbon coating.

References Cited in the file of this patent
UNITED STATES PATENTS

| | | |
|---|---|---|
| 2,772,181 | Rogers et al. | Nov. 27, 1956 |
| 2,930,104 | Watts et al. | Mar. 29, 1960 |